(12) United States Patent
Maruyama et al.

(10) Patent No.: US 6,280,878 B1
(45) Date of Patent: *Aug. 28, 2001

(54) ELECTRODE AND LITHIUM SECONDARY BATTERY USING THIS ELECTRODE

(75) Inventors: Satoshi Maruyama, Chiba; Masato Kurihara, Tokyo; Akira Kakinuma, Akita, all of (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,581

(22) Filed: May 29, 1998

(30) Foreign Application Priority Data

May 30, 1997 (JP) .................................................. 9-157487

(51) Int. Cl.$^7$ ...................................................... H01M 4/64
(52) U.S. Cl. .................. 429/233; 429/236; 429/245; 429/231.1; 429/231.8; 429/330; 429/300; 429/304
(58) Field of Search ..................................... 429/304, 300, 429/129, 233, 236, 245, 330, 231.1, 231.8

(56) References Cited

U.S. PATENT DOCUMENTS

| 3,985,574 | | 10/1976 | Feuillade et al. ..................... 429/162 |
| 4,470,859 | * | 9/1984 | Benezra et al. ....................... 429/254 |
| 5,296,318 | | 3/1994 | Gozdz et al. ......................... 429/192 |
| 5,434,024 | * | 7/1995 | Ikeda et al. .......................... 429/234 |
| 5,436,091 | * | 7/1995 | Shackie et al. ....................... 429/192 |
| 5,470,357 | | 11/1995 | Schmutz et al. ..................... 429/192 |
| 5,597,665 | * | 1/1997 | Harada et al. ........................ 429/235 |
| 5,858,264 | * | 1/1999 | Ichino et al. ......................... 429/192 |

FOREIGN PATENT DOCUMENTS

| 4-315768 | 6/1992 | (JP) . |
| 6-196169 | 7/1994 | (JP) . |

* cited by examiner

*Primary Examiner*—Laura Weiner
(74) *Attorney, Agent, or Firm*—Oblon, Spivak, McClelland, Maier & Neustadt, P.C.

(57) ABSTRACT

An electrode comprising a porous metal member in sheet form having a three-dimensional skeleton structure and a solid polymer electrolyte is used to construct a lithium secondary battery and an electric double-layer capacitor. Owing to the increased retaining force of the gel electrolyte component to a current collector, the gel electrolyte component can be directly applied to the current collector, contributing to mass scale productivity and cost reduction.

16 Claims, No Drawings

ELECTRODE AND LITHIUM SECONDARY BATTERY USING THIS ELECTRODE

BACKGROUND OF THE INVENTION

1. Field of the Invention

This invention relates to an electrode structure having a current collector of a lithium secondary battery, electric double-layer capacitor or the like, and a lithium secondary battery and electric double-layer capacitor using the electrode.

2. Background Art

Secondary batteries for use in notebook size personal computers, video cameras and the like are required to have a high energy density and a satisfactory charge/discharge cycle life. The secondary batteries which have been used heretofore include lead acid batteries, nickel-cadmium batteries, and nickel-hydrogen batteries. Lithium secondary batteries were proposed and have been used in practice as a secondary battery having a higher energy density.

In the prior art, liquids are used as the electrolyte of such secondary batteries. If the electrolyte is made solid, it is attractive as batteries of the next generation type because solid electrolytes can prevent liquid leakage and enables sheet structuring. In particular, if lithium ion secondary batteries which now enjoy rapid widespread use in notebook size personal computers and the like can be structured into a sheet form or multilayer compact size, they are expected to find a wider range of application.

In order that such solid electrolytes be used, it is proposed to construct them as ceramic materials, polymeric materials or composite materials. Among others, gel electrolytes which are plasticized using a polymeric electrolyte and an electrolytic solution are considered promising in the development of electrolytes because they have both the high conductivity of liquids and the plasticity of polymers.

An example of utilizing a gel electrolyte in a battery is already disclosed in U.S. Pat. No. 3,985,574. This patent includes examples in which a polyacetal which has been gelled by incorporating therein a supporting electrolyte such as ammonium perchlorate and a solvent such as propylene carbonate is used as a separator or positive electrode. A battery is constructed using lithium as the negative electrode. The positive electrode is prepared by bonding a honeycomb grid to a metal such as silver under heat and pressure and applying the gel thereto. Further, U.S. Pat. No. 5,296,318 discloses a practical system.

Specifically, U.S. Pat. No. 5,296,318 discloses that a copolymer of poly(vinylidene fluoride) with hexafluoropropylene is used as polymeric matrices of a positive electrode, negative electrode and separator of a lithium intercalation battery. The key feature of this disclosure is the use of the specific copolymer. The reason why characteristics can be improved is believed to be that since not only a binder alone is added to the electrode, but a gel electrolyte composition is also mixed during formation of the electrode, the electrode well matches with the electrolyte so that the internal resistance can be reduced. That is, unlike the solution system, an electrode composition inherent to the gel electrolyte system (referred to as gel electrode composition, hereinafter) is constructed.

Further, U.S. Pat. No. 5,470,357 discloses an electrode structure wherein a metal grid of aluminum or copper is used as the current collector. The method of making electrodes involves forming a film of a gel electrode composition and then bonding a metal grid thereto by the application of heat and pressure. The electrode composition cannot be applied to the grid during formation of the electrode because when a practical slurry is used, it cannot be fully held by the grid. Also, the results of our study showed that the use of a copolymer of poly(vinylidene fluoride) with hexafluoropropylene as the gel electrolyte was impractical because adhesion between the electrode and the collector metal was weak. Accordingly, it is believed that the manufacturing process described in Examples of U.S. Pat. No. 5,470,357 is used in practice. More particularly, it is necessary to previously coat the collector with a paint in which a conductive aid is mixed with a polymeric matrix component in a gel electrolyte, a paste in which a conductive material is added to a hot-melt paint as shown in the above-referred patent, or a conductive paint for use in electrolytic capacitors. Usually, the electrode (film+collector) is prepared by bonding the thus obtained grid to the gel electrode composition film under heat and pressure. It is thus apparent that a special step is necessary during formation of the electrode, leading to a reduced mass productivity and an increased cost.

SUMMARY OF THE INVENTION

An object of the invention is to provide an electrode capable of increasing the retaining force of a gel electrolyte component to a collector for enabling direct coating of the gel electrolyte component to the collector and thus featuring improved mass productivity and a reduced cost; and to provide a lithium secondary battery and an electric double-layer capacitor using the electrode.

The above object is achieved by the following construction.

(1) An electrode comprising a porous metal member in sheet form having a three-dimensional skeleton structure and a solid polymer electrolyte.

(2) The electrode of (1) wherein said solid polymer electrolyte comprises a gelled polymer matrix containing an electrolytic solution.

(3) The electrode of (1) wherein said porous metal member has a porosity of 80 to 98% and a mean maximum pore diameter of 100 to 800 $\mu$m.

(4) A lithium secondary battery comprising the electrode of (1).

(5) An electric double-layer capacitor comprising the electrode of (1).

FUNCTION

With the above-described problems borne in mind, we made investigations on the electrode which is easier to manufacture. We have found that the desired electrode can be obtained by tailoring the electrode structure using a porous metal member having a three-dimensional skeleton structure. That is, a porous metal member having a three-dimensional skeleton structure is used as the collector instead of the grid, thereby increasing the retaining force of a gel electrolyte component to the collector for enabling direct coating or printing of the gel electrolyte component to the collector. Further, as will be described later, since the porous metal member having a three-dimensional skeleton structure is contained within the electrode, the internal resistance of the electrode is reduced and rated properties are improved. This advantage is attributable to the porous metal member having a three-dimensional skeleton structure as used herein, and becomes more prominent when a gel electrolyte favored by the invention is used.

It is already disclosed in JP-A 315768/1992 to apply to the collector a porous metal member having a three-dimensional skeleton structure. In this patent, the porous metal member is used in a nickel-oxygen battery for the purpose of preventing the active material from separating from the collector surface. As opposed to this, in the present invention, the porous metal member having a three-dimensional skeleton structure plays not only the role of holding the active material, but also the role of holding the gelled electrolyte.

When the gelled solid polymer electrolyte favored by the invention is used, mere contact of the active material with the collector surface is not important, but the co-presence of three phases which are the collector, the gelled solid polymer electrolyte and the active material is important. Herein, the active material must be in contact with the collector, with a conductive aid interposed therebetween. In the case of a solution system, a three-phase coexisting region is generally formed even when the active material is not in contact with the collector because the solution fully penetrates internally. Therefore, a three-phase interface is formed even when it is not positively intended to form such an interface, and direct coating to a foil is possible. However, in the even where the solid electrolyte is used, if the active material is in direct contact with the collector surface, the formation of a three-phase interface becomes difficult and electrode reaction is extremely obstructed. Therefore, the collector/conductive aid/solid polymer electrolyte joint is necessary as described above, for which the porous metal member having a three-dimensional skeleton structure must be used.

DESCRIPTION OF THE PREFERRED EMBODIMENTS

Now the illustrative construction of the present invention is described in detail.

The electrode of the invention comprises a porous metal member in sheet form having a three-dimensional skeleton structure and a solid polymer electrolyte. By combining the porous metal member having a three-dimensional skeleton structure with the solid polymer electrolyte, there can coexist the three phases of a collector, a gelled solid polymer electrolyte and an active material. It then becomes possible to directly coat the gelled solid polymer electrolyte to the collector, and hence, to produce an electrode of high performance at a high efficiency.

Porous Metal Member

To prepare the porous metal member having a three-dimensional skeleton structure used herein, a spongy plastic foam having a three-dimensional reticulated skeleton structure or synthetic fiber sheet is coated with a metal or alloy by such methods as plating and thermal spraying, obtaining a porous metal. Examples of the metal to be applied include copper, nickel, aluminum, iron, chromium, zinc, tin, lead, silver, cadmium, cobalt, gold, and platinum. When the electrode is applied to lithium secondary batteries, copper, nickel, stainless steel or the like is preferred for the negative electrode, and aluminum or the like is preferred for the positive electrode. Examples of the spongy plastic foam having a three-dimensional reticulated skeleton structure or synthetic fiber sheet to be coated include foams of plastics such as polyesters, styrene, vinyl chloride, polyacrylonitrile, polyisocyanate, polypropylene and polyethylene, and synthetic fibers of polyethylene, polypropylene, polyesters, polyvinyl alcohol, polyurethane, polyamides, regenerated cellulose, etc. Preferred are foams of polyurethane (urethane foams).

After the metal or alloy is applied to the spongy plastic foam or synthetic fiber sheet, the foam or sheet is heated and roasted whereby the foam or sheet is removed. This is followed by annealing treatment, leaving a porous metal member having a three-dimensional skeleton structure.

The porous or cellular metal member preferably has a porosity of about 80 to 98%, especially about 90 to 95%, and a mean maximum pore diameter of about 100 to 800 $\mu$m, especially about 250 to 500 $\mu$m, as calculated from equivalent circles to surface-exposed pores. The porosity and mean pore diameter can be determined by observing the surface under a scanning electron microscope (SEM). The porous metal member is of sheet form, preferably having a thickness of about 0.1 to 3 mm, more preferably about 0.3 to 1 mm, and especially about 0.4 to 0.6 mm.

Polymer for Solid Electrolyte

The polymer used herein for the solid electrolyte is not critical. The intended use in electrochemical application requires that the polymer be stable against voltage and have satisfactory thermal and mechanical properties. For this reason, well-known gel type SPE polymers are preferable. Exemplary polymers include chemically crosslinked gels obtained by polymerizing an acrylate containing ethylene oxide which is a photo-polymerizable monomer with a polyfunctional acrylate, polyacrylonitrile, polyethylene oxide, and polypropylene oxide; and physically crosslinked gels based on fluorinated polymers such as polyvinylidene fluoride (PVDF), vinylidene fluoride-hexafluoropropylene copolymers, vinylidene fluoride-chlorotrifluoroethylene copolymers P(VDF-CTFE), vinylidene fluoride-hexafluoropropylene fluoro-rubber, vinylidene fluoride-tetrafluoroethylene-hexafluoropropylene fluoro-rubber, and vinylidene fluoride-tetrafluoroethylene-perfluoroalkyl vinyl ether fluoro-rubber. The preferred vinylidene fluoride base polymers contain at least 50% by weight, especially at least 70% by weight of vinylidene fluoride (VDF). Of the above-mentioned polymers, polyvinylidene fluoride, abbreviated as PVDF, copolymers of vinylidene fluoride (VDF) with hexafluoropropylene (HFP), and copolymers of vinylidene fluoride (VDF) with chlorotrifluoroethylene (CTFE), abbreviated as P(VDF-CTFE), are preferred.

These polymers are commercially available. For example, VDF-CTFE copolymers are commercially available under the trade name of Sefral Soft G150 and G180 from Central Glass K.K. and Soref 31508 from Nippon Solvay K. K. VDF-HFP copolymers are commercially available under the trade name of KynarFlex 2750 (VDF:HFP=85:15 wt %) and KynarFlex 2801 (VDF:HFP=90:10 wt %) from Elf Atochem and Soref 11008, Solef 11010, Solef 21508 and Solef 21510 from Nippon Solvay K.K.

Solvent of Electrolytic Solution

As the solvent of the electrolytic solution, those solvents which do not undergo decomposition under a high voltage applied are preferred when the intended application to lithium secondary batteries and capacitors is taken into account. Exemplary solvents used herein are non-aqueous solvents and include carbonates such as ethylene carbonate (EC), propylene carbonate (PC), butylene carbonate, dimethyl carbonate (DMC), diethyl carbonate, and ethyl methyl carbonate; and tetrahydrofuran (THF), 2-methyltetrahydrofuran, 1,3-dioxolan, 4-methyldioxolan, γ-butyrolactone, sulfolane, 3-methylsulfolane, dimethoxyethane, diethoxyethane, ethoxymethoxyethane, and ethyl diglyme. Although the quantitative ratio of the solvent to the polymer depends on the type of the solvent and the polymer used, it is preferred to add about 40 to 100% by weight of the polymer to the solvent. Also although the quantitative ratio of the polymer-mixed solvent to the electrolyte depends on the type of the polymer-mixed solvent and the electrolyte used, it is preferred to add about 0.5 to 2 mol/liter of the electrolyte to the polymer-mixed solvent.

Active Material

When the electrode of the invention is used in lithium secondary batteries, it is preferred to use such an active material as carbon, lithium metal, lithium alloy or oxide materials as the negative electrode active material and to use such an active material as oxide or carbon capable of intercalating and deintercalating lithium ions as the positive electrode active material.

The carbon used as the active material may be properly selected from natural or artificial graphite, resin fired carbon materials, and carbon fibers. They are used in powder form. Preferred among these is graphite desirably having a mean particle size of 1 to 30 $\mu$m, especially 5 to 25 $\mu$m. A smaller mean particle size tends to reduce the charge/discharge cycle life and to increase the variation of capacity (between individual cells). A larger mean particle size would lead to a significantly greater variation of capacity and a lower average capacity. It is believed that a variation of capacity results from a larger mean particle size because the contact of graphite with the collector and the contact between graphite particles become inconsistent.

Composite oxides containing lithium are preferred as the oxide capable of intercalating and deintercalating lithium ions. Such oxides are, for example, $LiCoO_2$, $LiMn_2O_4$, $LiNiO_2$, and $LiV_2O_4$.

Also, where the electrode of the invention is used in electric double-layer capacitors, it is preferred to use the above-described activated carbon as the active material.

The active material is preferably added to a mixed solution of the polymer and the electrolyte in a ratio of the active material to the mixed solution of from about 97/3 to about 40/60 although the ratio varies with the type of the active material.

Electrolyte

The electrolyte is preferably selected from electrolyte salts in dissolved form such as $LiPF_6$, $LiClO_4$, $LiBF_4$, $LiAsF_6$, $LiSO_3CF_3$, and $(CF_3SO_2)_2NLi$ when the application to lithium batteries is taken into account. Also, quaternary ammonium salts such as tetraethylammonium perchlorate and tetraethylammonium fluoroborate are useful as well as the foregoing alkali metal salts containing lithium when the electrolyte is used in electric double-layer capacitors. An appropriate electrolyte salt compatible with the solvent may be selected from these and other examples depending on the electro-chemical device to which the invention is applied. These electrolyte salts may be used alone, or a plurality of salts may be used in a predetermined mix ratio. The concentration of the electrolyte salt in the electrolytic solution of non-aqueous solvent system is preferably about 0.1 to 5 mol/liter. Maximum conductivity is generally available at a concentration of about 1 mol/liter.

Method

Now it is described how to prepare the electrode of the invention.

First, there is furnished a spongy plastic foam having a three-dimensional reticulated skeleton structure or synthetic fiber sheet as the skeleton member. In the case of a urethane foam, for example, a sheet-shaped urethane foam is used as the skeleton member, and is given conductivity, for example, by immersing in a solution having graphite dispersed, followed by drying and solidification, or by electroless plating.

The foam is further provided with a layer of a metal or alloy such as copper, nickel, stainless steel or aluminum by such techniques as electrolytic plating, electroless plating and thermal spraying. At this point, the metal or alloy preferably builds up to a thickness of about 50 to 100 $\mu$m.

The skeleton member having the metal or alloy layer coated thereon is heat treated for removing the skeleton member. Preferably the heating temperature is equal to or above the temperature at which the skeleton member burns or gasifies, but below the melting point of the metal or alloy layer and especially about 450 to 600° C. If desired, the porous metal member from which the skeleton member has been removed is subject to heat treatment for annealing purpose. The annealing temperature is preferably about 600 to 1,200° C. although it varies with the type of the metal or alloy layer. The porous metal member is then cut to the predetermined shape, obtaining a collector.

Next, a coating solution is prepared by dispersing the electrode material such as carbon material in a polymer solution. The solvent used for the coating solution may be selected as appropriate from various solvents in which the polymer is soluble. For example, N,N-dimethylformamide, dimethylacetamide, N-methylpyrrolidone, acetone, methyl ethyl ketone, and methyl isobutyl ketone may be used.

The dispersing/dissolving step may be carried out by adding filler particles to the polymer solution, and mixing the mixture for dispersion and dissolution at room temperature or elevated temperature using a mixer such as a magnetic stirrer or homogenizer or a dispersing apparatus such as a ball mill, super sand mill or pressure kneader.

The concentration and viscosity of the coating solution may be determined as appropriate depending on the coating means. Usually, the concentration of the polymer in the solvent is preferably 3 to 30% by weight. The amount of the polymer added is preferably about 3 to 20 parts by weight per 100 parts by weight of the electrode material. For example, where the electrode material is a carbon material, the ratio of the carbon material to the polymer is preferably in the range from 85/15 to 94/6% by weight. A less amount of the polymer would lead to insufficient adhesion whereas an excessive amount of the polymer would lead to a reduced battery capacity or capacitor capacitance.

The means for applying the coating solution to the collector is not critical and may be determined as appropriate depending on the material and shape of the collector. In general, doctor blade coating, electrostatic painting, dipping, spraying, roll coating, metal mask printing, gravure coating and screen printing techniques are used. Thereafter, rolling treatment is carried out by means of a platen press or calender roll, if necessary.

The coating solution is coated to the collector and dried, forming a coating. The coating solution is preferably applied to such an extent that all the pores in the collector are filled with the coating solution and the entire surface of the collector (excluding connections to lead terminals) is covered with the coating solution.

Where the electrode of the invention is used as the electrode of a lithium secondary battery, the electrolytic solution is prepared by dissolving a lithium-containing electrolyte in a non-aqueous solvent. The lithium-containing electrolyte may be selected from $LiClo_4$, $LiBF_4$, $LiPF_6$, $LiCF_3SO_3$, $LiN(CF_3SO_2)$ and $LiAsF_6$, for example. The non-aqueous solvent may be selected from ethers, ketones, carbonates, and organic solvents as exemplified in JP-A 121260/1988, for example.

The use of the above-described polymer binder leads to a substantially improved charge/discharge cycle life. If the above-described polymer is not used as the binder for the active material, the battery capacity would gradually decrease upon repetitive charge/discharge cycles because the polymer can be gradually dissolved in the electrolytic solution.

The lithium secondary cell using the electrode according to the invention is not particularly limited in structure although it is generally comprised of a positive electrode, a negative electrode, an optional separator, and a gel electrolyte or electrolytic solution and applicable to sheet-shaped batteries and cylindrical batteries. It is noted that liquid electrolytes can be used as the electrolyte although the use of solid polymer electrolytes is especially preferred. In this case, the above-described fluorinated rubber polymeric resins such as P(VDF-CTFE) are preferably used as the polymer of the gel electrolyte.

It is also acceptable to use the electrode of the invention as one electrode while the other electrode is constructed from a commonly used collector. As the collector in this embodiment, it is a common practice to use aluminum etc. for the positive electrode and copper, nickel, etc. for the negative electrode. The collector may be either a foil or a mesh (or grid).

The electrode of the invention is also useful in electric double-layer capacitors.

In the electric double-layer capacitors, a gel solid electrolyte containing an electrolytic solution is preferably used in addition to polarizable electrodes as described above. The electrolytic solution is preferably of organic solvents. It is especially preferred to use polymeric electrolytes and in this case, the P(VDF-CTFE) according to the invention can also be used as the polymer of the gel electrolyte.

Included in the electrolyte salt are $(C_2H_5)_4NBF_4$, $(C_2H_5)_3CH_3NBF_4$, and $(C_2H_5)_4PBF_4$.

The organic solvent may be selected from well-known various solvents, preferably electrochemically stable nonaqueous solvents such as propylene carbonate, ethylene carbonate, γ-butyrolactone, acetonitrile, N,N-dimethylformamide, 1,2-dimethoxyethane, sulfolane and nitromethane, alone or in admixture.

In the electrolytic solution of such organic solvent, the electrolyte may have a concentration of about 0.1 to 3 mol/liter.

The structure of the electric double-layer capacitor in which the electrode of the invention is used is not critical. Usually a separator is interleaved between a pair of polarizable electrodes while electrode layers on the polarizable electrodes and the separator are impregnated with the electrolytic solution. An insulating gasket is disposed at the periphery of the polarizable electrodes and the separator. Such an electric double-layer capacitor may be any of the so-called coin, sheet and cylindrical types.

It is also acceptable to use the electrode of the invention as one electrode while the other electrode is constructed from a commonly used polarizable electrode. The collector in this embodiment may be conductive rubber such as conductive butyl rubber, or it may be formed by thermal spraying of metals such as aluminum and nickel or by attaching a metal mesh to one surface of the electrode layer.

EXAMPLE

Examples of the present invention are given below by way of illustration.

Example 1

Preparation of gel electrolyte source solution

A source solution was prepared by weighing a copolymer of poly(vinylidene fluoride) with hexafluoropropylene (P(VDF-HFP) KynarFlex 2801 by Elf Atochem, HFP proportion ~6 mol %, molecular weight Mw=380,000) as the polymer, a solution of 1M $LiClO_4$ in ethylene carbonate/propylene carbonate (EC:PC=3:1) as the electrolytic solution, and acetone as the solvent so as to give a weight ratio of P(VDF-HFP):1M $LiClO_4$/propylene carbonate:acetone=3:7:5, agitating and mixing them in a homogenizer at room temperature to 50° C. for about 1 to 5 hours.

Preparation of gel electrolyte film

A film of gel electrolyte was prepared by applying the source solution onto a quartz substrate as a thin layer, followed by drying and peeling.

Preparation of gel electrode slurry

A slurry was prepared by mixing the source solution and graphite as the negative electrode active material in a weight ratio of 2:1, and dispersing at room temperature for 60 minutes by means of a magnetic stirrer.

Fabrication of battery

A porous metal member having a three-dimensional skeleton structure was furnished by dipping a urethane foam (HR-50 by Bridgestone K. K.) in a graphite slurry, followed by drying and solidification, thereby imparting conductivity to the foam. Copper plating of 100 μm was applied to the foam, which was heated and burned at 500° C. for 10 minutes and then subjected to chemical reduction at 800° C. for 20 minutes. The resulting porous metal member had an average porosity of 95% and a mean maximum pore diameter of 500 μm. It was cut to the predetermined dimensions, obtaining a collector.

To the collector, the electrode-forming slurry prepared above was applied so as to give a dry thickness of 0.2 mm by a doctor blade technique, and dried in a dry atmosphere to form a negative electrode. Separately, a positive electrode was prepared by mixing the gel electrolyte solution, $LiCoO_2$ as the active material and acetylene black as the conductive aid in a weight ratio of 2:7.5:1.2, and agitating them into a slurry in the same manner as the above-described electrode slurry. As described in U.S. Pat. No. 5,470,357, a gel electrode composition membrane was prepared using the slurry, and bonded under heat and pressure to an aluminum grid of 60 μm mesh.

The thus obtained positive electrode, gel electrolyte film and negative electrode were laid in order, obtaining a lithium secondary battery.

Comparative Example 1

A lithium secondary battery was fabricated as in Example 1 except that a copper grid of 60 μm mesh was used as the collector.

Comparative Example 2

A lithium secondary battery was fabricated using a copper grid as the collector as in Comparative Example 1. As described in U.S. Pat. No. 5,470,357, a gel electrode composition membrane was prepared before it was bonded under heat and pressure to the copper grid.

Comparative Example 3

A lithium secondary battery was fabricated as in Example 1 except that a copper foil was used as the collector.

Comparative Example 4

A lithium secondary battery of the electrolytic solution system was fabricated using the negative electrode material used in Example 1 as the negative electrode, the positive electrode material used in Example 1 as the positive electrode, and the solution of 1M $LiClO_4$ in ethylene carbonate/propylene carbonate (EC:PC=3:1) used in Example 1 as the electrolytic solution.

The lithium batteries thus obtained were examined for direct printing or coating of the gel electrode slurry, initial capacity, and capacity retention after 30 cycles. The results are shown in Table 1.

TABLE 1

|     | Direct printing or coating | Initial capacity (mAh/g) | Capacity retention after 30 cycles (%) |
| --- | --- | --- | --- |
| E1  | OK  | 123 | 90  |
| CE1 | NO  | —   | —   |
| CE2 | —   | 121 | 80  |
| CE3 | NO  | —   | —   |
| CE4 | —   | 120 | 90  |

Example 2

A lithium battery was fabricated as in Example 1 except that a copolymer having a backbone consisting of vinylidene fluoride and chlorofluoroethylene and a poly(vinylidene fluoride) on a side chain ((P(VDF-CTFE), Sefral Soft G180F100 by Central Glass K. K., CTFE proportion ~15 mol %, molecular weight Mw=120,000) was used as the polymer.

Comparative Examples 5–8

In Example 2, the same procedures as in Comparative Examples 1 to 4 were carried out. These are Comparative Examples 5 to 8.

The lithium batteries thus obtained were examined for direct printing or coating of the gel electrode slurry, initial capacity, and capacity retention after 30 cycles. The results are shown in Table 2.

TABLE 2

|     | Direct printing or coating | Initial capacity (mAh/g) | Capacity retention after 30 cycles (%) |
| --- | --- | --- | --- |
| E2  | OK  | 125 | 90  |
| CE5 | NO  | —   | —   |
| CE6 | —   | 120 | 80  |
| CE7 | OK  | 118 | 60  |
| CE8 | —   | 122 | 90  |

Example 3

A porous metal member was furnished by evaporating aluminum onto a urethane foam and heat treating the aluminum-deposited urethane foam for removing the urethane foam, leaving a porous aluminum member. A slurry was prepared by mixing the gel electrolyte source solution, $LiCoO_2$ as the positive electrode active material, and acetylene black as the conductive aid in a weight ratio of 2:7.5:1.2, and dispersing at room temperature for 30 minutes to 3 hours by means of a magnetic stirrer. As in Example 1, the slurry was applied to the porous aluminum member and dried, obtaining a positive electrode.

A battery was fabricated as in Example 1 with substitution of this positive electrode for the positive electrode of Example 1 and examined as in Example 1, finding further improvements in initial capacity and capacity retention.

Example 4

A polarizable electrode and a gel electrolyte were prepared as in Example 1, but using activated carbon having a specific surface area of 1,500 to 2,000 $m^2/g$ as the active material, propylene carbonate as the electrolytic solution, and $(C_2H_5)_4NBF_4$ as the electrolyte salt, and changing the shape of the collector and gel electrolyte to conform to the 2016 type. They were received in a 2016 type coin-shaped cell, constructing an electric double-layer capacitor.

The electric double-layer capacitor thus obtained was subjected to a charge/discharge test between 0 V and 2 V, finding favorable characteristics. When the capacitance per gram of activated carbon was measured, a capacitance of 30 F/g was marked.

BENEFITS OF THE INVENTION

As described above, the present invention provides an electrode capable of increasing the retaining force of a gel electrolyte component to a collector for enabling direct coating of the gel electrolyte component to the collector and thus featuring improved mass productivity and a reduced cost as well as a lithium secondary battery and an electric double-layer capacitor using the electrode.

What is claimed is:

1. An electrode comprising a porous metal member in sheet form having a 3-dimensional reticulated skeleton structure and a coating comprising a solid polymer electrolyte and an active material, wherein said porous metal member has a porosity of 80 to 98% and mean maximum pore diameter of 100 to 800 μm.

2. The electrode of claim 1 wherein said solid polymer electrolyte comprises a gelled polymer matrix containing an electrolytic solution.

3. A lithium secondary battery comprising the electrode of claim 1.

4. The lithium secondary battery of claim 3, further comprising an electrolyte comprising at least one electrolyte salt selected from the group consisting of $LiPF_6$, $LiClO_4$, $LiBF_4$, $LiAsF_6$, $LiSO_3CF_3$, and $(CF_3SO_2)_2NLi$.

5. The electrode of claim 1, wherein said porous metal member comprises at least one metal selected from the group consisting of Cu, Ni, Al, Fe, Cr, Zn, Sn, Pb, Ag, Cd, Co, Au, and Pt.

6. The electrode of claim 1, wherein said porosity is 90 to 95%.

7. The electrode of claim 1, wherein said mean maximum pore diameter is 250 to 500 μm.

8. The electrode of claim 1, wherein said porous metal member has a thickness of 0.1 to 3 mm.

9. The electrode of claim 1, wherein said porous metal member has a thickness of 0.4 to 0.6 mm.

10. The electrode of claim 1, wherein said solid polymer electrolyte comprises a chemically crosslinked gel obtained by polymerizing a photopolymerizable acrylate ethylene oxide with a polymer selected from the group consisting of a polyfunctional acrylate, polyfunctional polyacrylonitrile, polyfunctional polyethylene oxide, and polyfunctional polypropylene oxide.

11. The electrode of claim 1, wherein said solid polymer electrolyte comprises at least one polymer selected from the group consisting of polyvinylidene fluoride, a vinylidene fluoride-hexafluoropropylene copolymer, a vinylidene fluoride-chlorotrifluoroethylene copolymer, a vinylidene fluoride-hexafluoropropylene fluoro-rubber, a vinylidene fluoride-tetrafluoroethylene-hexafluoropropylene fluoro-rubber, and a vinylidene fluoride-tetrafluoroethylene-perfluoroalkyl vinyl ether fluoro-rubber.

12. The electrode of claim 1, wherein said solid polymer electrolyte comprises at least one non-aqueous solvent selected from the group consisting of ethylene carbonate, propylene carbonate, butylene carbonate, dimethyl carbonate, diethyl carbonate, ethyl methyl carbonate, tetrahydrofuran, 2-methyltetrahydrofuran, 1,3-dioxolane, 4-methyldioxolane, γ-butyrolactone, sulfolane, 3-methylsulfolane, dimethoxyethane, diethoxyethane, ethoxymethoxyethane, and ethyldiglyme.

13. The electrode of claim 1, wherein said active material comprises at least one material selected from the group consisting of carbon, lithium metal, lithium alloy, and lithium oxide.

14. The electrode of claim 13, wherein said carbon is selected from the group consisting of natural graphite, artificial graphite, a resin fired carbon material, and carbon fibers.

15. The electrode of claim 14, wherein said graphite has a mean particle size of 1 to 30 $\mu$m.

16. The electrode of claim 13, wherein said lithium oxide is selected from the group consisting of $LiCoO_2$, $LiMn_2O_4$, $LiNiO_2$, and $LiV_2O_4$.

* * * * *

UNITED STATES PATENT AND TRADEMARK OFFICE
CERTIFICATE OF CORRECTION

PATENT NO.    : 6,280,878 B1
DATED         : August 28, 2001
INVENTOR(S)   : Satoshi Maruyama et al.

It is certified that error appears in the above-identified patent and that said Letters Patent is hereby corrected as shown below:

<u>Title page,</u>
Delete Item [54] in its entirety and replace with -- [54] ELECTRODE, AND LITHIUM SECONDARY BATTERY AND ELECTRIC DOUBLE-LAYER CAPACITOR USING THE ELECTRODE --.

Signed and Sealed this

Eleventh Day of June, 2002

Attest:

Attesting Officer

JAMES E. ROGAN
*Director of the United States Patent and Trademark Office*